US008645507B2

(12) United States Patent
Caspi et al.

(10) Patent No.: US 8,645,507 B2
(45) Date of Patent: Feb. 4, 2014

(54) POWER MANAGEMENT FOR A COMMUNICATIONS SYSTEM

(75) Inventors: Rami Caspi, Sunnyvale, CA (US); Jeffrey Blohm, Portola Valley, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 882 days.

(21) Appl. No.: 12/264,923

(22) Filed: Nov. 5, 2008

(65) Prior Publication Data
US 2010/0115084 A1 May 6, 2010

(51) Int. Cl.
*G06F 15/177* (2006.01)

(52) U.S. Cl.
USPC ............ 709/220; 709/223; 709/225; 709/203

(58) Field of Classification Search
USPC .................................. 709/225, 223, 220, 203
See application file for complete search history.

(56) References Cited

U.S. PATENT DOCUMENTS

| | | | |
|---|---|---|---|
| 5,995,139 A * | 11/1999 | Lee | 348/143 |
| 6,480,580 B1 * | 11/2002 | Beswick et al. | 379/88.13 |
| 7,240,836 B2 | 7/2007 | Vrotsos et al. | |
| 7,249,269 B1 | 7/2007 | Motoyama | |
| 2003/0012149 A1 | 1/2003 | Maggenti et al. | |
| 2004/0028208 A1 | 2/2004 | Carnazza et al. | |
| 2004/0128564 A1 * | 7/2004 | Dubinsky | 713/300 |
| 2004/0240652 A1 | 12/2004 | Kanada | |
| 2005/0075147 A1 | 4/2005 | Fabien et al. | |
| 2005/0288069 A1 * | 12/2005 | Arunan et al. | 455/574 |
| 2006/0029389 A1 * | 2/2006 | Cleary et al. | 398/33 |
| 2006/0206445 A1 * | 9/2006 | Andreoli et al. | 706/52 |
| 2007/0289771 A1 * | 12/2007 | Osaka et al. | 174/250 |
| 2007/0298771 A1 | 12/2007 | Mottes | |
| 2009/0191893 A1 * | 7/2009 | Smith | 455/456.1 |
| 2009/0217072 A1 * | 8/2009 | Gebhart et al. | 713/330 |
| 2010/0049804 A1 * | 2/2010 | Tervo et al. | 709/206 |
| 2010/0080214 A1 * | 4/2010 | Li et al. | 370/352 |

FOREIGN PATENT DOCUMENTS

WO 2007040815 A1 4/2007

OTHER PUBLICATIONS

Thomas Wiemers and Tim Wilson, Introduction to the OpenScape Unified Communications (UC) Server, White Paper, Mar. 2008, pp. 1-14, Siemens Enterprise Communications GmbH & Co KG, Germany.
Bruce Nordman and Ken Christensen, Improving the Energy Efficiency of Ethernet-Connected Devices: A Proposal for Proxying, Sep. 2007, pp. 1-15, Ethernet Alliance, United States of America.
Supplementary European Search Report and European Search Opinion for European Patent No. 09825293.5dated Apr. 25, 2013.
"OpenScape V1.0 Technical White Paper" Internet Citation, Apr. 2003, XP-002322314, http://www.siemens.com/Daten/siecom/HQ/ICN/Internet/Enterprise_Networks/WORKAREA/kasprzyk/templatedata/English/document/binary/openscape_technicalwhitepaper_1091757.pdf.

* cited by examiner

*Primary Examiner* — Lan-Dai T Truong
(74) *Attorney, Agent, or Firm* — Buchanan Ingersoll & Rooney PC (57) ABSTRACT

Described herein is a method and system for facilitating power management in a communications system. The communications system includes a server and one or more communications devices operably coupled to a network, each communications device being operable to enter a low power state in response to a "hibernate" command. The "hibernate" command may be provided by a power management unit in the server in response to, for example, a change in routing preference, location or availability status of the user.

25 Claims, 5 Drawing Sheets

| Time | Task | Use-Count of Device A (e.g., conference room phone) |
|---|---|---|
| 09:50 | Starting condition | 0 (low power state) |
| 09:55 | User X changes her preferred device list to include device A and goes to the room. | 1 |
| 09:57 | User Y changes his preferred device list to include device A and goes to the room. | 2 |
| 10:00 | User Z's presence automation changes her preferred device list to include device A. | 3 |
| 11:00 | User Z's presence automation changes her preferred device list to exclude device A. | 2 |
| 11:02 | User X returns to her desk and changes her routing to go to her desk phone and not device A. | 1 |
| 11:03 | User Y returns to his desk and changes his presence to Away and goes for lunch. His calls are routed directly to VoiceMail. | 0 (low power state) |

POWER MANAGEMENT FOR A COMMUNICATIONS SYSTEM

TECHNICAL FIELD

This invention generally relates to communications systems and, particularly to improvements in power management of such systems.

BACKGROUND

Unified Communications (UC) applications are becoming the preferred communications solution for enterprises. These applications provide a multi-modal solution for real-time delivery of voice and data communications based on the preferred method and location of the system user. UC applications replace legacy voice private branch exchange (PBX) with a much more powerful, flexible and configurable communications solution.

A UC product typically includes server elements and user "endpoint" elements. User endpoint elements comprise, for example, Internet Protocol (IP) telephones. An IP telephone generally has the form and appearance of a traditional office telephone. However, its internal structure resembles that of a computing device more than a legacy office telephone. A typical IP telephone consumes about 25 Watts when active. Since IP telephones are generally always on, their annual energy consumption may be as much as 220 kilowatt-hour (kWh) per year per telephone. Assuming a cost of $0.15 for each kWh, for example, this energy consumption yields a significant energy cost of about $33 per year for each IP telephone.

As such, there is a need for new communications solutions to be "green" or more energy efficient, which in turn reduces the carbon footprint of the offered solution.

SUMMARY

A method and system for facilitating power management in a communications system is described herein. The communications system includes a server and one or more communications devices operably coupled to a network, each communications device being operable to enter a low power state in response to a "hibernate" command. The "hibernate" command may be provided by a power management unit in the server in response to, for example, a change in routing preference, location or availability status of the user.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present systems and methods and in order to meet statutory written description, enablement, and best-mode requirements. However, it will be apparent to one skilled in the art that the present systems and methods may be practiced without the specific exemplary details. In other instances, well-known features are omitted or simplified to clarify the description of the exemplary implementations of present systems and methods, and to thereby better explain the present system and methods. Furthermore, for ease of understanding, certain method steps are delineated as separate steps; however, these separately delineated steps should not be construed as necessarily order dependent in their performance.

Figure 1:
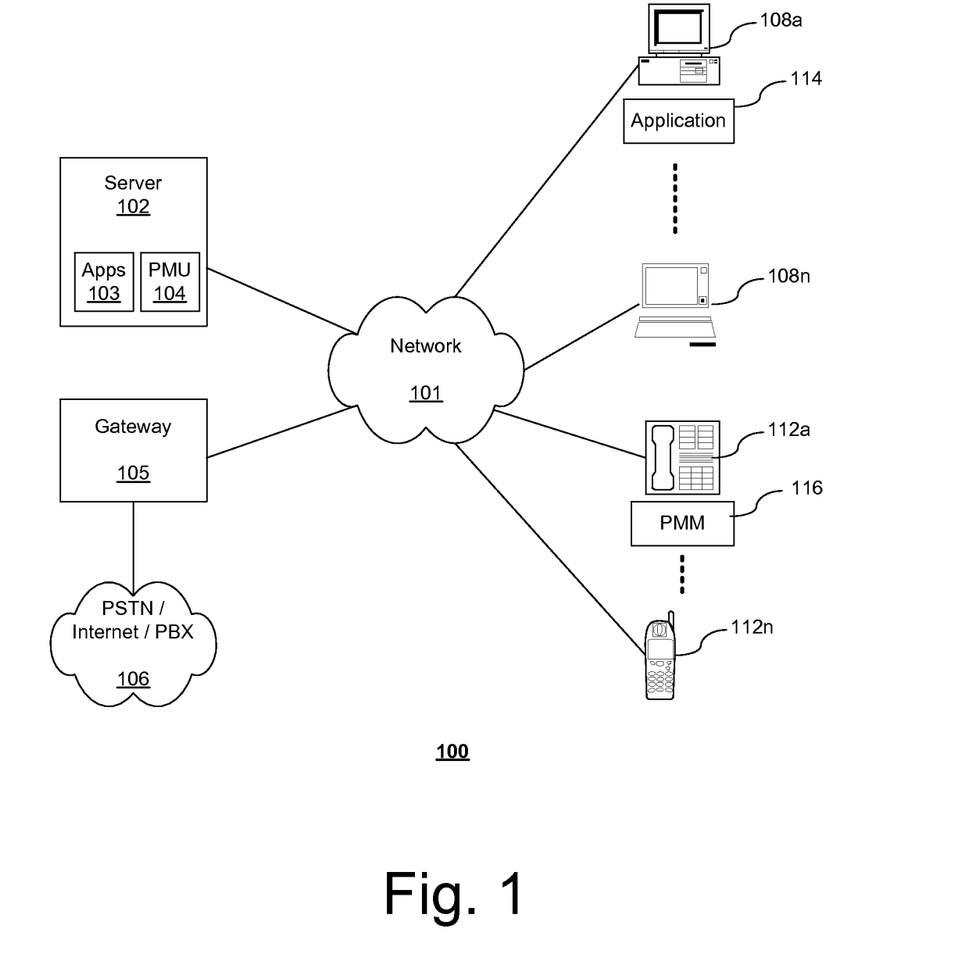
FIG. 1 illustrates an exemplary environment in which the power management scheme can be implemented.

The following description sets forth one or more implementations of systems and methods that facilitate a power management scheme for a communications system. FIG. 1 illustrates an exemplary environment in which a power management scheme can be implemented. In particular, FIG. 1 shows a communications system 100 having a unified communications (UC) architecture that provides unified voice messaging services and data services via an Internet Protocol (IP) network. It is noted that, while a particular UC architecture is shown, the invention is not limited to the specific embodiment illustrated. The present embodiment has application to any suitable UC system such as, for example, the OpenScape system available from Siemens Enterprise Communications, Inc. See generally, White Paper by Thomas Weimers and Tim Wilson, Introduction to the OpenScape Unified Communications (UC) Server. A major stride towards delivering the full Unified Communications solution, Siemens Enterprise Communications GmbH & Co KG, March 2008, which is herein incorporated by reference for all purposes. Other UC or non-UC systems, such as those provided by Cisco, Avaya and Nortel, may also be used.

As shown in FIG. 1, the communications system 100 includes a server 102 and one or more communications devices (108a-108n; 112a-112n) operably coupled to a network 101. Network 101 may be a local area network (LAN), the internet or the like. In addition, network 101 may be implemented using an Internet Protocol Suite (TCP/IP) network and may implement voice or multimedia over IP using, for example, Session Initiation Protocol (SIP). A gateway 105 providing access to a public network 106 may also be coupled to network 101. Gateway 105 may be implemented as a gateway to a private branch exchange (PBX), the public switched telephone network (PSTN), or any of a variety of other networks, such as a wireless, personal communications services (PCS), a cellular network, or the Internet.

Server 102 is operably coupled to network 101 to host the signaling functionality of the communications system 100. Server 102 may be a desktop personal computer, a portable laptop computer, another portable device, a minicomputer, a mainframe computer, a storage system, a dedicated digital appliance, another device having a storage sub-system configured to store a collection of digital data items, a microprocessor or other computing device. Alternatively, server 102 may be embodied as a distributed system comprising multiple computers, microprocessors or other computing devices. For example, a standard duplex OpenScape server may comprise one computer for the OpenScape UC application suite and one computer for the OpenScape Voice Communications infrastructure (i.e. soft switch unit). Server 102 may also include one or more controllers (not shown) and processor-storage media (e.g., computer storage or memory) for storing application programs, data and other processor-executable instructions. Server 102 may provide a variety of services to various associated communications devices (108a-108n, 112a-112n), including computers, telephones, personal digital assistants, text messaging units, and the like. Thus, as will be explained in greater detail below, server 102 may implement multiple applications 103 as well as, or including, a power management unit (PMU) 104, according to various implementations.

One or more communications devices (108a-108n and 112a-112n) may be operably coupled to network 101. Communications devices include computing devices 108a-108n and other network capable devices 112a-112n. It is to be understood that a communications device may be any device capable of communicating via network 101. Further, the communications device may be operable to enter a low power state in response to a "hibernate" signal or command, as will be discussed more fully below.

Computing devices 108a-108n may include personal computers, laptop computers, desktop computers, tablet computers, workstations, hand held computers, personal digital assistants and the like. The computing devices 108a-108n may implement network application programs 114 (e.g., soft clients or soft phones) that provide telephony services by interacting with server 102. It is to be understood that such telephony services may be invoked by either first party or third party control. First party control is provided by the network application program 114 that directly invokes telephony requests against a telephony switch, via for example, SIP. Third party control is provided by an external client which sends a request to the UC server, which in turn routes communications to at least one endpoint, which may include a network application program, a soft client or any other device (e.g., PSTN or cell phone). In addition, computing devices 108a-108n may include other multimedia messaging capabilities (not shown) using, for example, peripheral cameras, microphones and speakers or peripheral telephony handsets.

Network capable devices 112a-112n include LAN or IP telephones, video conferencing devices, cellular telephones or any suitable wireless network capable device or multi-function wireless capable device. One example of an IP telephone is the OpenStage™ IP telephone available from Siemens Enterprise Communications, Inc. Examples of wireless capability may include a wireless LAN (WLAN) or a Wi-Fi connection such as an IEEE 802.11a or 802.11b adapter, a cell phone capability or card or, a Bluetooth connection adapter. Network capable devices 112a-112n may also be any suitable wireless communications device such as a second generation (2G) or third generation (3G) wireless communications device, e.g., a typical cellular phone with text messaging, a wireless capable personal digital assistant (PDA) or, a multi-function wireless capable device.

In one implementation, a communications device may be associated or identifiable with at least one user of the communications system 100. The association between the communications device and the user (or location) may be established either statically or dynamically. The actual association may depend on the specific type of UC architecture or application used. Static association refers to the fixed association or identification of the communications device with at least one particular user. Such communications device may be dedicated to, or exclusively used by, a single user. Alternatively, it may be non-dedicated or shared between multiple users. Dynamic association refers to the association of the communications device with at least one user on an as-needed basis, according to certain pre-defined rules. When such pre-defined rules are deleted from the system, the dynamic association generally ends.

Dynamic association occurs when the communications system 100 actively selects the communications device and uses it in a particular communications session. For example, in a scenario when a user is waiting for an important call from a customer but is currently in the conference room instead of his office, he may configure a rule that routes calls from this customer to an extra shared telephone in the conference room. Even though the phone is not statically associated with the user, the rule allows the phone to be dynamically associated with the user by causing the communications system to dynamically bind any incoming calls from the customer to the user and route the calls to the extra conference room phone.

A communications device (108 or 112) may include a computer platform equipped with audio (or voice) processing circuits, such as digital signal processing (DSP) chips, dedicated input-output (I/O) components (e.g., keyboard, touch screen), audio components (e.g., handset, speaker or headset) or a combination thereof. A LAN controller (not shown) may also be included in the communications device (108 or 112). The LAN controller may be based on, for example, 10/100 MHz Ethernet technology.

In addition, the LAN controller may include a hardware power management module (PMM) 116, as shown. PMM 116 functions to conserve power by turning off substantially all circuits in the communications device, other than itself, in response to a "hibernate" command. The "hibernate" command may be issued from, for example, PMU 104, which will be discussed more fully below. Consequently, the communications device will be placed in a "low power state" or "standby state," consuming very low power. The power that the communications device consumes during the "low power state" varies depending on the specific device. For example, an IP telephone may consume about 25 Watts while in a normal operational state, and only about 5 Watts while in a "low power state."

In another implementation, the LAN controller initiates a power management protocol in response to the "hibernate" command. It is to be understood that the power management protocol may be initiated with or without hardware PMM 116. If no hardware PMM 116 is provided, the LAN controller may simply initiate the power management protocol upon receipt of the "hibernate" command. The complexity of the communications device is advantageously reduced in such case. If hardware PMM 116 is provided, the LAN controller may initiate the power management protocol based on the "hibernate" input command and/or internal device knowledge. In other words, the "hibernate" input command serves as an additional factor for the LAN controller to consider in determining whether the device is to be placed in a "lower power state." Device knowledge includes, for example, the time that the device was last used, low battery condition, manual control and the like. For example, if device knowledge indicates that the device was inactive for a period of time, the LAN controller may initiate the power management protocol. In addition, if PMM 116 receives a "hibernate" command indicating that the device is not likely to be used, the LAN controller also initiates the power management protocol.

One example of such power management protocol is the Ethernet proxy protocol, as defined by the Ethernet Alliance. See generally, White Paper by Bruce Nordman and Ken Christensen, Improving the Energy Efficiency of Ethernet-Connected Devices. A Proposal for Proxying, Version 1.0 September 2007, which is herein incorporated by reference for all purposes. The Ethernet Proxy protocol enables the communications device to consume very low power while still participating in important networking and routing protocols. For example, a low-power power management proxy may be used to maintain full network presence for a sleeping high-power communications device. The proxy may cover for the sleeping device by generating and responding to routine network and application layer packets. The proxy wakes up the device it is covering for only when it cannot handle a valid request, thereby enabling the device to sleep and save energy.

Figure 2A:
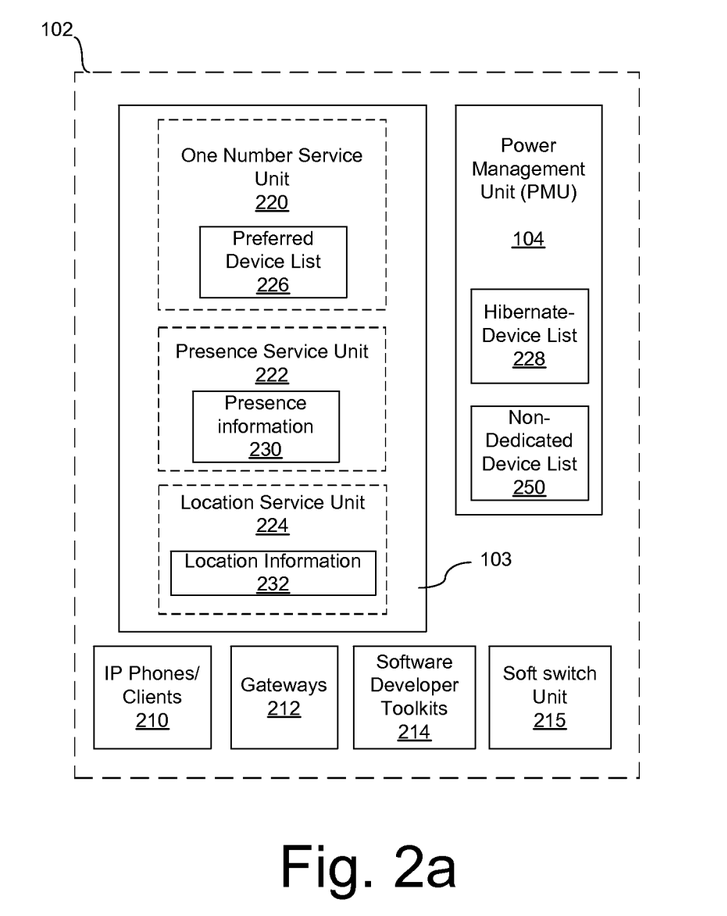
FIG. 2a shows a block diagram illustrating an exemplary server.

FIG. 2a shows a block diagram illustrating an exemplary server 102. In the discussion of FIGS. 2a-c, continuing reference will be made to elements and reference numerals shown in FIG. 1. As shown in FIG. 2a, server 102 implements an application suite 103 and a power management module 104. In one embodiment, server 102 also provides interfaces, such as application programming interfaces (APIs) to IP phones/clients 210, gateways 212 and/or software developer toolkits 214. In addition, server 102 may further include a soft switch unit 215 which communicates with, or is connected to, one or more registered communications devices (e.g., devices 108a-108n; 112a-112n). The soft switch unit 215 facilitates the registration of the communications devices with system 100. Soft switch unit 215 may include a registration database. For example, in a SIP environment, communications devices (e.g., devices 108a-108n; 112a-112n) may be registered with the system 100 and may show up, or be described in, the registration database as being assigned to particular identities.

An exemplary server environment capable of being adapted for use in a system according to the present implementation is the OpenScape system, available from Siemens Enterprise Communications, Inc. Such an environment may be implemented in conjunction with any suitable operating system, including but not limited to Linux, Unix, Apple and Microsoft Windows. In addition, such environment may be implemented with various tools related to directory integration (e.g., Microsoft Active Directory), database integration (e.g., IBM solidDB, Microsoft SQL Server), groupware integration (e.g., Microsoft Exchange, IBM Lotus Domino) and/or collaboration integration (e.g., Microsoft Office Live Communications Server, IBM Lotus Sametime). It is noted that the various control units discussed herein may be implemented as any suitable hardware, firmware, and software, or any combinations thereof.

In one implementation, application suite 103 includes a One Number Service Unit 220. The One Number Service Unit 220 implements the One Number Service feature, which allows a user to specify a single number to reach the user, regardless of how many devices the user has. The One Number Service Unit 220 maintains a preferred device list 226 associated with each user, specifying one or more communications devices or communications medium to which incoming communications are routed. Preferred device list 226 may be stored on the server 102 (as shown), or at distributed locations (e.g., on one or more connected communications devices 108a-108n, 112a-112n). The actual preferred device list information stored depends on the specific service used.

The user may specify one or more preferred communications devices (e.g., IP telephone, cellular telephone, PDA, desktop computer or laptop computer) on the preferred device list 226. The One Number Service Unit 220 then routes the user's incoming communications to the communications devices specified in the user's preferred device list 226. The communications devices in the preferred device list 226 may also be used for the initiation of outgoing communications. Communications may include the transmission of video data, audio data, graphical data, text data, multimedia data, data files or a combination thereof. Other types of data or media may also be included in the communications. Such communications may be used in various applications such as voice calls, video calls, video conferencing, e-mails, instant messages, file sharing and so forth.

In addition, the One Number Service Unit 220 may be implemented with a rules engine (not shown) to allow for finer granularity in routing the incoming communications. The rules engine may allow for the definition of default and/or special routing rules. Default rules are generally automatically predefined in the system to provide for "good behavior." For example, a default rule may be pre-defined to "route incoming voice calls to a routing list of one or more communications devices." A special rule may be defined by the user to override the default rule for certain circumstances. For example, the user may specify a special rule to "route incoming calls from ACME Manufacturing to my cell phone."

Power Management Unit (PMU) 104 may be configured to monitor the preferred device list 226 for changes made by the user. In one implementation, when the user specifies a new preferred device in the preferred device list 226, PMU 104 generates or updates a non-preferred device list (not-shown) associated with the user. The non-preferred device list specifies one or more communications devices that are associated with the user but are not listed on the preferred device list 226. The non-preferred device list may be merged with an unused device list (described below), if available, to generate a hibernate-device list 228. For each communications device specified in the non-preferred device list or the hibernate-device list 228, PMU 104 is configurable to send a "hibernate" command to the communications device.

In one implementation, the PMM 116 residing in the communications device turns off substantially all circuits in the device but itself in response to the "hibernate" command. Consequently, the devices on the hibernate-device list 228 are placed in a low power (or standby) state, thereby consuming very low power and having substantially zero carbon footprint. PMM 116 may operate to return the communications device to normal or full-power operational state when the communications device becomes a potential routing target or is removed from the hibernate-device list 228. PMM 116 may also return the communications device to normal operational state when the communications device is physically accessed by a user. Emergency usage of the communications devices is not jeopardized due to the fast power-on time of the communications devices. For example, IP telephones have fast power-on time and in case of an emergency, the IP telephone can be switched on in a few seconds and used for dialing the required emergency services.

Non-preferred device list defines one or more communications devices associated with the user but are not specified in the preferred device list 226. Such devices may be dedicated devices, non-dedicated devices or a combination thereof. Dedicated devices are used exclusively by the user. Non-dedicated devices are used non-exclusively by the user or shared between multiple users. If non-preferred device list defines non-dedicated devices, PMU 104 keeps track of all the users of each non-dedicated device. In one implementation, the "hibernate" command is only sent to the non-dedicated device when the non-dedicated device is not specified in any of the users' preferred device lists 226.

Application suite 103 may further include a presence service unit 222, which functions to maintain presence information (or identity context information) 230 associated with each user. Presence information 230 may be stored on server 102 (as shown), or at distributed locations (e.g., on one or more connected communications devices 108a-108n, 112a-112n). The actual presence information stored depends on the specific presence service used. In one implementation, presence information 230 indicates the presence and/or availability states of the user, such as "In the Office," "On Vacation," "Working Remotely," "Busy," "In Meeting," "Be Right Back," "Do not Disturb," and so forth. In addition, the presence service unit 222 may provide aggregated presence information by media type (e.g., voice, video, instant messaging, email) across multiple communications devices associated with a user. For example, if a user is accessible by any telephone device (e.g., office phone, home phone, mobile phone), the aggregated presence information for the user would indicate accessibility via the media type "telephone." Based on the aggregated presence information for each media type (e.g., available via telephone, available via video web-camera, unavailable via email), others can select the best medium to communicate with this user.

Presence information 230 may further include calendar data, contact data, time zone, text notes, location data or any data that might be found in a personal information manager (PIM) application. Such PIM information may be used to automatically change the presence and/or availability states of the user. For example, calendar data showing that the user is scheduled to be in a meeting can be used to set the user presence to "In Meeting" and the location field to the meeting location at the scheduled time.

PMU 104 may be configured to monitor the presence information 230 to detect any change in the user's current location or availability for communications purposes. In one implementation, PMU 104 generates an unused device list (not shown) to specify all devices that are not likely to be used by the user because the user is in a new location or is unavailable for communications purposes. For example, if the presence information 230 indicates that the user is scheduled to work from a non-local location on a particular day (e.g., "Working from home" or "On Business Trip"), PMU 104 adds local devices (e.g., located in the office) associated with the user to the unused device list. In another example, if the presence information indicates that the user is currently unavailable for communications (e.g., "In Meeting," "Out to Lunch," "On Vacation"), PMU 104 adds all the devices associated with the user to the unused device list.

In one implementation, the unused device list is merged with the non-preferred device list (described above), if available, to generate the hibernate-device list 228. For each communications device listed on the hibernate-device list 228, PMU 104 sends a "hibernate" command to conserve energy.

In addition, application suite 103 may further include a location service unit 224 to provide location information 232 associated with each user. In one implementation, location information 232 provides the current geolocation of the user. Geolocation refers to the real-world geographic location of a user, and may be derived by looking up the Internet Protocol (IP) address or Media Access Control (MAC) address associated with the communications device on a WHOIS service and retrieving the registrant's address. Other methods of providing the user's geolocation, such as radio-frequency-identification (RFID), Wi-Fi connection location technologies or global positional system (GPS), may also be used.

Location information 232 may be used to determine where the user is currently located or where the user is currently not located. For example, if the location information 232 shows that a user is in Los Angeles, it can safely determine that the user's associated devices in San Jose may not be used and therefore can be placed in "low power state." PMU 104 may be configured to monitor the location information 232 to detect any change in the user's location. If the location information 232 indicates that the user is in a location away from some of his or her devices, PMU 104 generates an unused device list (not shown). The unused device list specifies the devices associated with the previous location that the user cannot use because he or she is in the new location.

PMU 104 merges the unused device list with the non-preferred device list, if available, to generate the hibernate-device list 228. PMU 104 then sends a "hibernate" command to the communications devices specified on the hibernate-device list 228. One advantage of using location information is that in situations where the user forgets to update his or her preferred device list or presence information, the change in location information will automatically cause PMU 104 to send the "hibernate" commands to the respective devices on the hibernate-device list to conserve power.

Figure 2B:
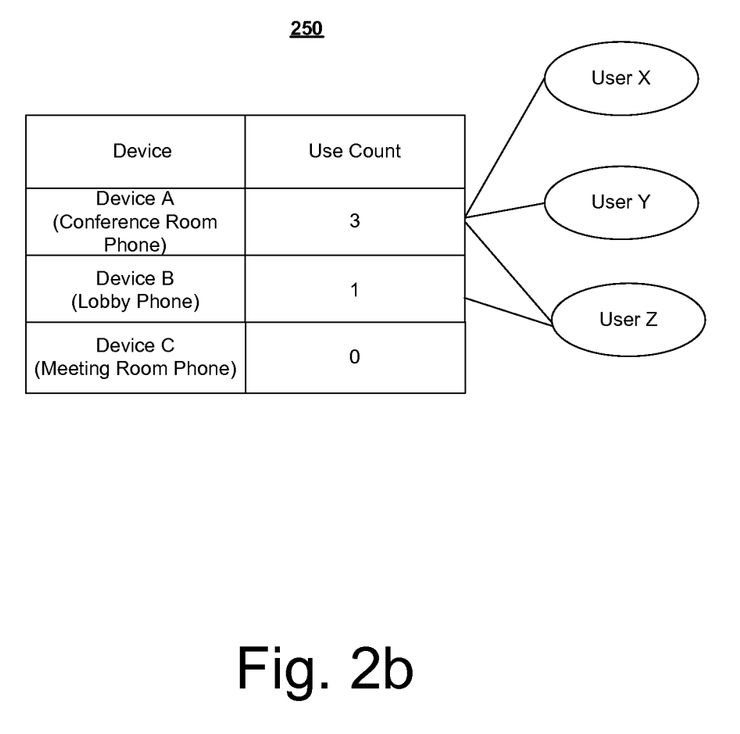
FIG. 2b shows an exemplary data structure for a non-dedicated device list.

In one implementation, PMU 104 further maintains a non-dedicated device list 250. Zero use-count entries in the non-dedicated device list 250 may be merged with the hibernate-device list 228. FIG. 2b shows an exemplary data structure for the non-dedicated device list 250. The non-dedicated device list defines one or more non-dedicated (or shared) communications devices (e.g., Device A, Device B, Device C) and the users that are associated with each device (e.g., User X, User Y, User Z). For each communications device on the list, a use-count is maintained. The use-count of a device tracks the number of users routing their incoming communications to that device. The routing may be performed either manually or automatically. To perform the routing manually, the user specifies the device on his or her respective preferred device list. Alternatively, the routing may be performed automatically by server 102 when it detects, for example, a change in presence information or location information associated with the user. If the use-count of a device reaches zero (see, for example, Device C), indicating that no users are routing their communications to that device, a "hibernate" command is sent to that device to place it in "low power state."

Figure 2C:
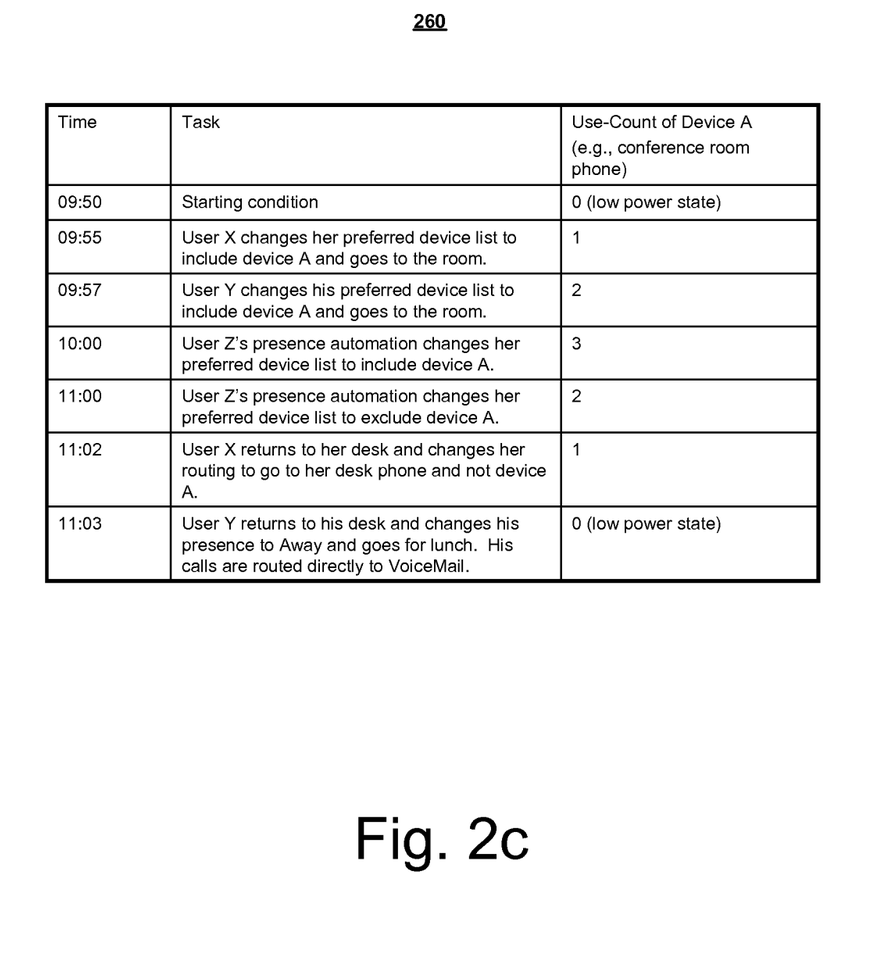
FIG. 2c shows an exemplary timeline during which a device use-count is updated.

FIG. 2c shows an exemplary timeline during which the use-count of an exemplary Device A is updated. For purposes of illustration, the timeline represents events occurring during a meeting from 10:00 to 11:00. Users X, Y and Z are attendees of the meeting in the conference room, and Device A is physically located in the conference room. Device A may be, for example, an IP telephone. Referring to FIG. 2c, at 09:50, the use-count of Device A is set to "0" or zero since the meeting has not started. At 09:55, user X changes her preferred device list to include Device A, causing the use-count to be set to "1". At 09:57, user Y changes his preferred device list to include Device A, and the use-count is set to "2". At 10:00, user Z's presence information (indicating that the meeting has started) causes server 102 to automatically change her preferred device list to include Device A, and to set the use-count to "3". At 11:00, user Z's presence information (indicating that the meeting has ended) causes the system to automatically change her preferred device list to exclude Device A, and to set the use-count to "2". At 11:02, user X returns to her desk and manually routes her incoming communications to another device (e.g., her desk phone), causing the use-count to be set to "1". At 11:03, user Y returns to his desk and manually changes his presence status to "Away" and goes on his lunch break. His calls are routed to his Voicemail, and the use-count of Device A is set to "0" or zero. The zero use-count causes server 102 to send a "hibernate" command to Device A, placing it in "low power state." Device A may remain in "low power state" until a user indicates that he or she wants to use it (e.g., by putting it on the preferred device list or physically using the device).

Figure 3:
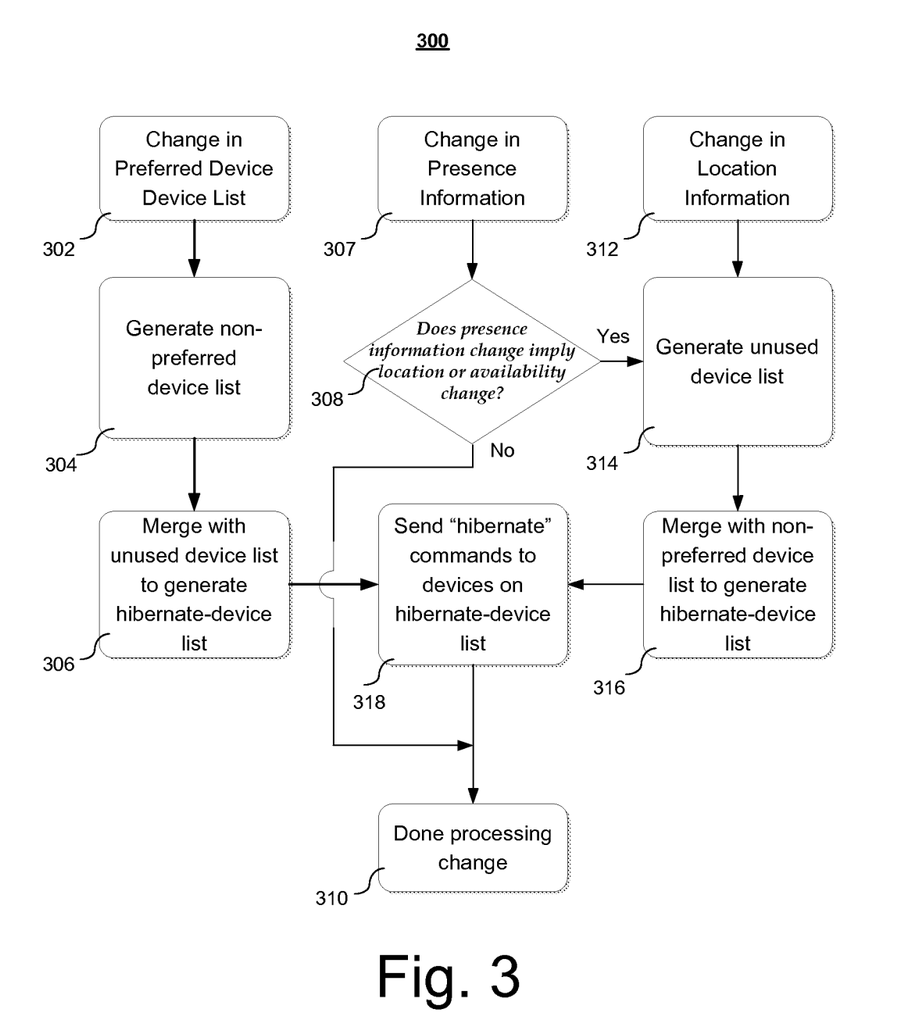
FIG. 3 depicts a methodological implementation of a power management unit.

FIG. 3 depicts a methodological implementation of PMU 104. This methodological implementation may be performed in software, hardware, or a combination thereof. In the discussion of FIG. 3, continuing reference will be made to elements and reference numerals shown in FIGS. 1-2.

Referring to FIG. 3, a method 300 of managing power in a communications system is shown. Method 300 generally comprises monitoring information associated with a user and determining if a change in the information indicates that a communications device associated with the user is not likely to be used. If the change in information indicates that the associated communications device is not likely to be used, a "hibernate" command is sent to that communications device, causing it to enter a low power state.

More specifically, at 302, PMU 104 monitors the preferred device list 226 associated with each user for any changes. The preferred device list 226 may specify one or more communications devices as destinations to route incoming communications for the user.

At 304, PMU 104 generates a non-preferred device list in response to a change in preferred device list. Non-preferred device list defines one or more devices used by or associated with the user but are not stored in the preferred device list 226. The communications devices may be dedicated devices, non-dedicated devices or a combination thereof.

At 306, PMU 104 merges the non-preferred device list with an unused device list, if available, to generate the hibernate-device list. The unused device list may be generated in response to a change in presence information (at 307) or a change in location information (at 312), as will be described in more details below.

At 307, PMU 104 monitors the presence information (or identity context information) associated with each user to detect any changes. Presence information includes, for example, user presence information, employee calendar data, contact data or any data that might be found in a PIM application.

At 308, the change in presence information is evaluated to determine if there is a change in the user's location or availability for communications purposes. If the change in presence information indicates no location or availability change, change processing is completed at 310. If the change in presence information indicates a location or availability change, an unused device list is generated at 314. The unused device list specifies devices that are not likely to be used by the user because of the user's new location or unavailability for communications purposes.

The unused device list may also be generated by detecting a change in location information at 312. Location information 232 provides information about the current location of the user. A change in location information indicates that the user is in a location away from at least one of the devices associated with the user. PMU 103 may add to the unused device list the one or more devices that the user cannot or is not likely to use due to the user's current location.

At 316, the unused device list may be merged with the non-preferred device list, if available, to generate the hibernate-device list 228. At 318, PMU 104 sends "hibernate" commands to the one or more communications devices defined in the hibernate-device list 228. Such devices are placed in a low power (or standby) state in response to the "hibernate" commands, thereby consuming very low power.

The present method of managing power in a communications system as described above may be extended to control other power consuming elements associated with the user. For example, if the user is "On a Business Trip" or in a location away from the office, PMU 104 may send a power-off command to lighting controllers and heating controllers in that user's office. If direct control of these power consuming elements is not desirable, the information from the present method may be provided as input into a generic energy management system. For example, the generic energy management system may proactively adjust the climate control or heating, ventilating, and air conditioning (HVAC) of the office depending on the number of users currently working in the office.

An implementation of PMU 104 may be described in the general context of processor-executable instructions, such as event modules, executed by one or more computers, or other devices or processors. Generally, program modules include routines, programs, objects, components, data structures, etc., that perform particular tasks or implement particular abstract data types. Typically, the functionality of the program modules may be combined or distributed as desired in various embodiments.

An implementation of the PMU 104 may be stored on some form of processor storage media. Processor storage media may be any available media that may be accessed by a processor, including volatile and non-volatile, removable and non-removable media implemented in any method or technology for storage of information such as processor readable instructions, data structures, program modules, or other data. Processor storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A communications system comprising:
 a plurality of communications devices being associated with a user;
 a server having a power management unit; and
 wherein the power management unit generates a non-preferred device list based on a preferred device list, and wherein incoming calls are routed to at least one preferred communications device of the plurality of communications devices specified in the preferred device list; and
 wherein the preferred device list identifies at least one of the communications devices on which communications are preferred to be received by the user and the non-preferred device list identifies at least one of the communications devices on which communications are not preferred to be received by the user;
 wherein the non-preferred device list identifies the plurality of communications devices associated with the user that are not specified in the preferred device list; and
 wherein the power management unit monitors presence information of the user relating to use of any of the communications devices identified in the preferred device list and any of the communications devices identified in the non-preferred device list and generates an unused device list based on a change in the presence information of the user,
 the unused device list identifying at least one unused communications device of the plurality of communications devices that are not to be used by the user due to the change in the presence information, the at least one unused communications device comprising at least one communications device of the preferred device list or the non-preferred device list; and wherein the power management unit merges the non-preferred device list and the unused device list to generate a hibernate device list; and wherein the power management unit sends a hibernate command to all communications devices identified in the hibernate device list; and wherein the hibernate command causes the at least one communications devices that receive the hibernate command to enter a low power state.

2. The communications system of claim 1 further comprising at least one non-dedicated communications device associated with a plurality of users, each of the plurality of users having a corresponding preferred communications device list, and wherein the corresponding communications device list identifies at least one corresponding preferred communications device of each of the plurality of users to which calls are routed, and wherein the power management unit sends a hibernate command to the at least one non-dedicated device if the non-dedicated device does not appear in the corresponding preferred communications device list of any of the plurality of users.

3. The communications system of claim 1 wherein the at least one communications devices that receive the hibernate command comprises at least one of an internet protocol (IP) telephone, a cellular telephone, a PDA, a desktop computer, and a laptop computer.

4. The communications system of claim 1 wherein the server has a one number service that routes an incoming call for any one of the plurality of communications devices to the at least one preferred communications device.

5. The communications system of claim 1 wherein each one of the plurality of communications devices comprises a power management module which turns off all circuits in the communications device, other than itself, in response to receipt of the hibernate command.

6. The communications system of claim 1 wherein each of the communications devices that receive the hibernate command returns to a full power state following that communications device being removed from the hibernate list.

7. The communications system of claim 1 further comprising at least one non-dedicated communications device associated with a plurality of users, and wherein the power management unit tracks a number of users of the plurality of users that route calls to the at least one non-dedicated communications device and wherein the power management units sends a hibernate command to the at least one non-dedicated communications device if the number of users that route calls to the at least one non-dedicated communications device is zero.

8. The communications system of claim 1 wherein each of the communications devices that receive the hibernate command return to a full power state when that communications device is accessed by the user.

9. The communications system of claim 1 wherein the preferred device list identifies at least one dedicated communications device used exclusively by the user.

10. The communications system of claim 9 wherein the preferred device list identifies at least one non-dedicated device shared by multiple users.

11. The communications system of claim 1 wherein the server further comprises a location service unit which provides location information associated with the user.

12. The communications system of claim 11 wherein the power management unit monitors the location information for a change in a location of the user and generates a second unused communications device list, and wherein the second unused communications device list comprises at least one second unused communications device that cannot be used by the user due to the change in the location of the user.

13. The communications system of claim 12 wherein the power management unit merges the second unused communications device list into the hibernate list.

14. A method of managing power in a communications system that comprises a power management unit of a server, the power management unit monitoring a preferred device list corresponding to a user, the preferred device list specifying at least one preferred communications device of a plurality of communications devices associated with the user to which incoming calls are routed, the method comprising:

the power management unit generating a non-preferred device list in response to a change in the preferred device list, the non-preferred device list identifying each of the plurality of communications devices that are not listed in the preferred device list;

wherein the preferred device list identifies at least one of the communications devices on which communications are preferred to be received by the user and the non-preferred device list identifies at least one of the communications devices on which communications are not preferred to be received by the user;

the power management unit monitoring presence information of the user relating to use of any of the communications devices identified in the preferred device list and any of the communications devices identified in the non-preferred device list to determine if there is a change in the presence information;

the power management unit generating an unused device list based on the change in the presence information of the user, the unused device list identifying at least one unused communications device of the plurality of communications devices that are not to be used by the user due to the change in the presence information, the at least one unused communications device comprising at least one communications device of the preferred device list or the non-preferred device list;

the power management unit merging the non-preferred device list with an unused device list to generate a hibernate list; and the power management unit sending a hibernate command to all communications devices identified in the hibernate list, the hibernate command causing the communications devices to enter a low power state.

15. The method of claim 14 wherein the non-preferred device list identifying at least one non-dedicated communications device associated with a plurality of users, and wherein each of the plurality of users have a corresponding preferred communications device list, and wherein the corresponding communications device list identifying at least one corresponding preferred communications device for each of the plurality of users to which calls are routed, and the method further comprising the power management unit sending a hibernate command to the at least one non-dedicated device if the non-dedicated device does not appear in the corresponding preferred communications device list of any of the plurality of users.

16. The method of claim 14 wherein each one of the plurality of communications devices comprises a power management module, and the method further comprising the power management module turning off all circuits in the communications devices that receive the hibernate command to enter the low power state in response to receipt of the hibernate command.

17. The method of claim 14 further comprising each of the communications devices of the hibernate list that receives the hibernate command returning to a full power state when that communications device is removed from the hibernate list.

18. The method of claim 14 further comprising the user specifying the at least one preferred communications device.

19. The method of claim 14 further comprising the power management unit automatically specifying the at least one preferred communications device.

20. The method of claim 14 further comprising the communications device returning to a full power state when the communications device that receives the hibernate command is activated by the user.

21. The method of claim 14 further comprising the power management unit monitoring location information of the user for a change in a location of the user.

22. The method of claim 21 further comprising the power management unit generating a second unused communications device list, the second unused communications device list comprising at least one unused communications device that can no longer be used by the user due to the change in the location of the user.

23. The method of claim 22 further comprising the power management unit merging the second unused communications device list with the non-preferred device list and the other unused device list to generate the hibernate list.

24. A communications system comprising:
a plurality of communications devices being associated with a user;
a server having a power management unit; and
wherein the power management unit generates a non-preferred device list based on a preferred device list, the non-preferred device list identifying the plurality of communications devices associated with the user that are not specified in the preferred device list; and
wherein the preferred device list identifies at least one of the communications devices on which communications are preferred to be received by the user and the non-preferred device list identifies at least one of the communications devices on which communications are not preferred to be received by the user;
wherein incoming calls are routed to at least one preferred communications device of the plurality of communications devices specified in the preferred device list;
wherein the power management unit monitors presence information of the user relating to use of any of the communications devices identified in the preferred device list and any of the communications devices identified in the non-preferred device list and generates a first unused device list based on a change in the presence information of the user, and the first unused device list identifying at least one unused communications device of the plurality of communications devices that are not to be used by the user due to the change in the presence information, the at least one unused communications device comprising at least one communications device of the preferred device list or the non-preferred device list;
wherein the power management unit monitors location information of the user and generates a second unused device list based on a change in the location information of the user, the second unused device list comprising at least one unused communications device of the plurality of communications devices that cannot be used by the user due to the change in the location information;
wherein the power management unit merges the non-preferred device list, the first unused device list, and the second unused device list and generates a hibernate device list; and
wherein the power management unit automatically updates the at least one preferred communications device of the plurality of communications devices specified in the preferred device list based on the first unused device list and the second unused device list; and
wherein the power management unit sends a hibernate command to all communications devices identified in the hibernate device list; and
wherein the hibernate command causes each of the communications devices that receive the hibernate command to turn off all circuits except a power management module of that device to enter a low power state.

25. The communications system of claim 24 further comprising at least one non-dedicated communications device associated with a plurality of users, and wherein the power management unit tracks a number of users of the plurality of users that route calls to the at least one non-dedicated communications device and wherein the power management units sends a hibernate command to the at least one non-dedicated communications device if the number of users that route calls to the at least one non-dedicated communications device is zero.

* * * * *